United States Patent [19]

Pomeroy

[11] Patent Number: 4,487,060

[45] Date of Patent: Dec. 11, 1984

[54] RAILWAY BRAKE PRESSURE MONITOR

[75] Inventor: Richard J. Pomeroy, West Vancouver, Canada

[73] Assignee: Glenayre Electronis, Ltd., Vancouver, Canada

[21] Appl. No.: 495,714

[22] Filed: May 18, 1983

[51] Int. Cl.³ .............................................. G01L 5/28
[52] U.S. Cl. .................................. 73/129; 246/169 R
[58] Field of Search ............. 73/121, 129; 246/169 R; 303/86, DIG. 1

[56] References Cited

U.S. PATENT DOCUMENTS

| 2,403,938 | 7/1946 | Macan | 177/211 |
|---|---|---|---|
| 3,281,554 | 10/1966 | Bowman | 200/81 |
| 3,304,420 | 2/1967 | Bowman | 246/169 |
| 3,838,272 | 9/1974 | Bull | 246/169 R |
| 3,901,562 | 8/1975 | Powell et al. | 303/86 |
| 3,937,074 | 2/1976 | Burkett | 73/121 |
| 3,948,083 | 4/1976 | Wickham | 73/39 |
| 4,317,988 | 3/1982 | Wilson | 235/92 MT |
| 4,319,787 | 3/1982 | Wickham | 303/86 |
| 4,361,825 | 11/1982 | Shockley | 340/52 C |

Primary Examiner—Jerry W. Myracle
Attorney, Agent, or Firm—Christensen, O'Connor Johnson & Kindness

[57] ABSTRACT

The railway brake pressure monitor includes a sensor/transmitter unit (STU) and a remote display unit (RDU). The sensor/transmitter unit is mounted on the last vehicle of a railway train and coupled with the brake pipe thereof and includes a pressure transducer (80), an electronic circuit board module (82), a radio transmitter (84) and a battery pack (86). The pressure transducer, the electronic circuit board module, and the radio transmitter are powered by the battery pack, and the electronic circuit board module (which includes a programmed microcomputer (96)) functions to repetitively monitor the pressure transducer to measure the brake pipe air pressure, and to cause the radio transmitter to transmit reports including the brake pipe air pressure, the states of a plurality of external status inputs, and a battery status indication. Report transmission is triggered by various events. The remote display unit includes a radio receiver (250), a microcomputer (268), a display (258), an audible beeper (256), and a manually-actuable pushbutton (ACK). The remote display unit functions to receive the report, to display the brake pipe air pressure value therein, and to selectively display the external status input states and the battery status indication therein. Provision is also made to provide various alarms, through the audible beeper and the display, upon the occurrence of certain events, each of which alarms may be reset by the manually-actuable switch.

29 Claims, 13 Drawing Figures

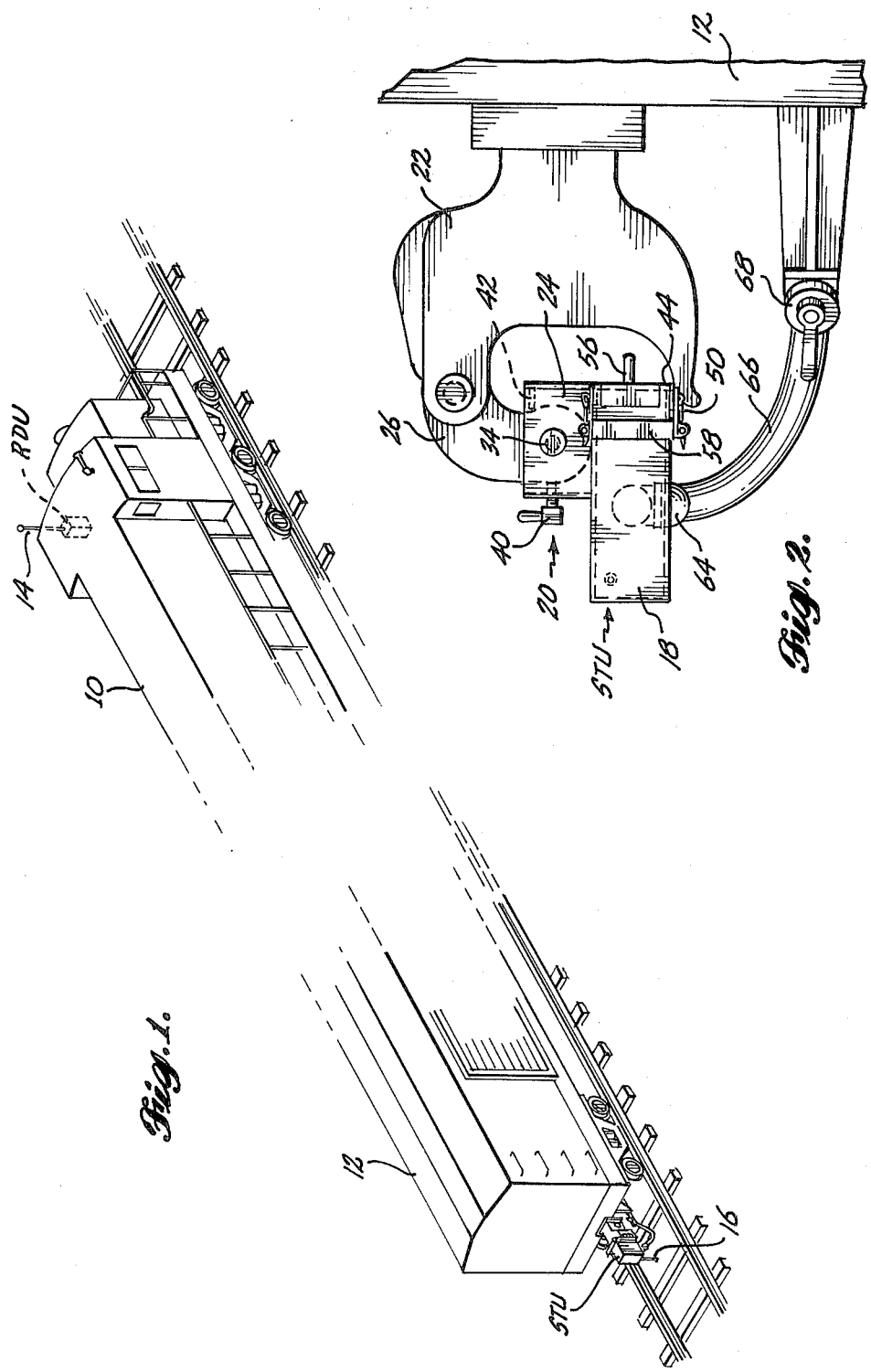

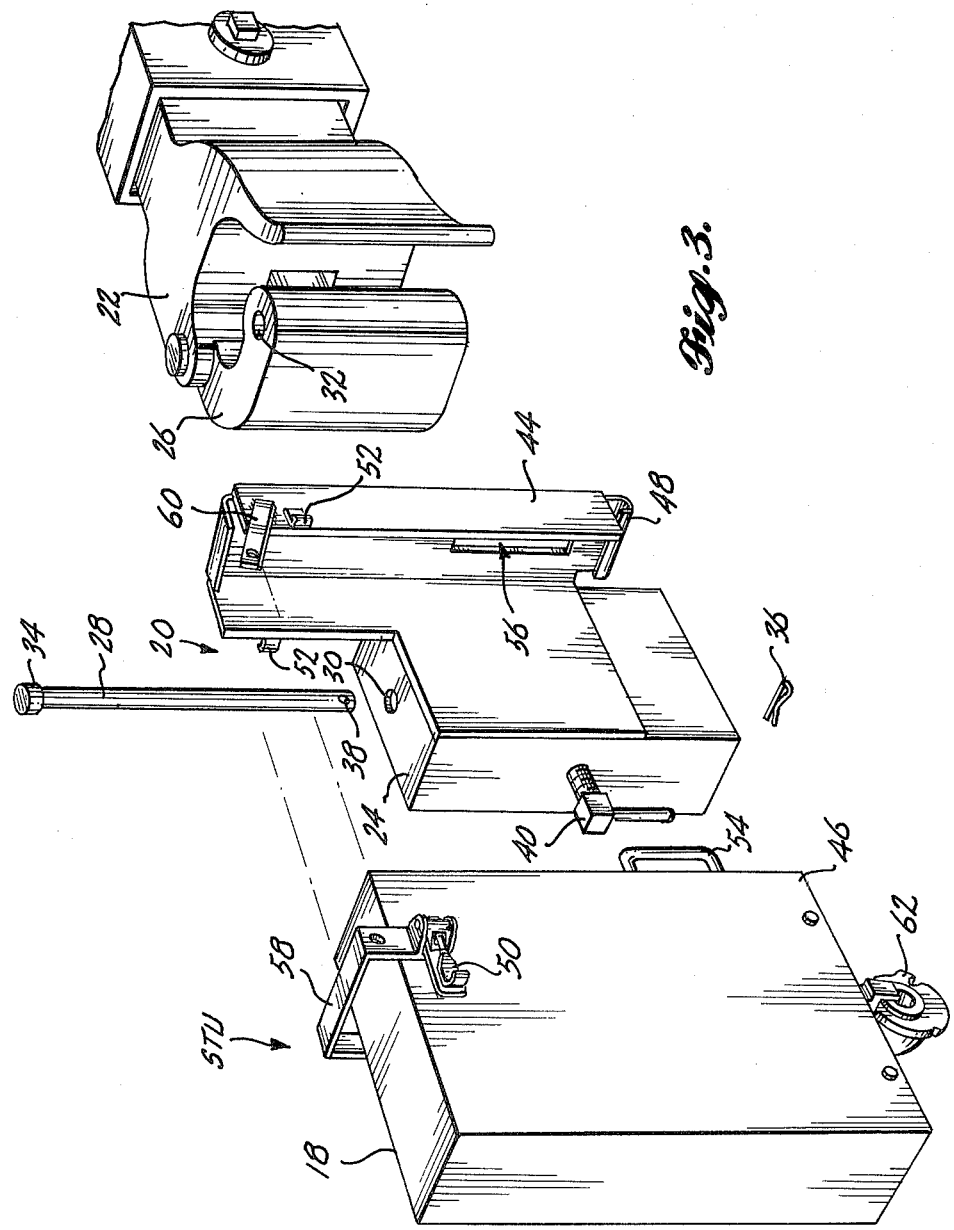

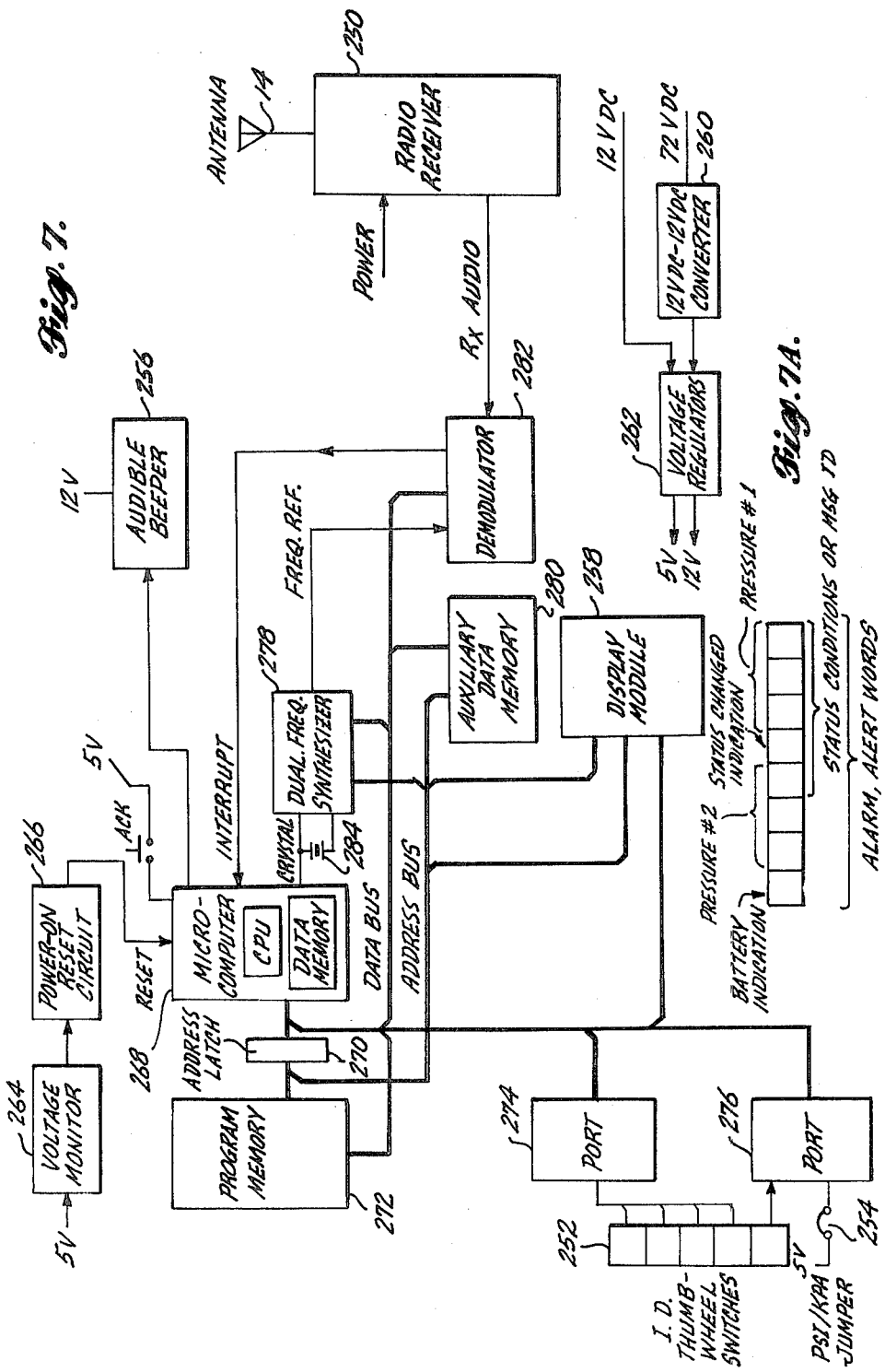

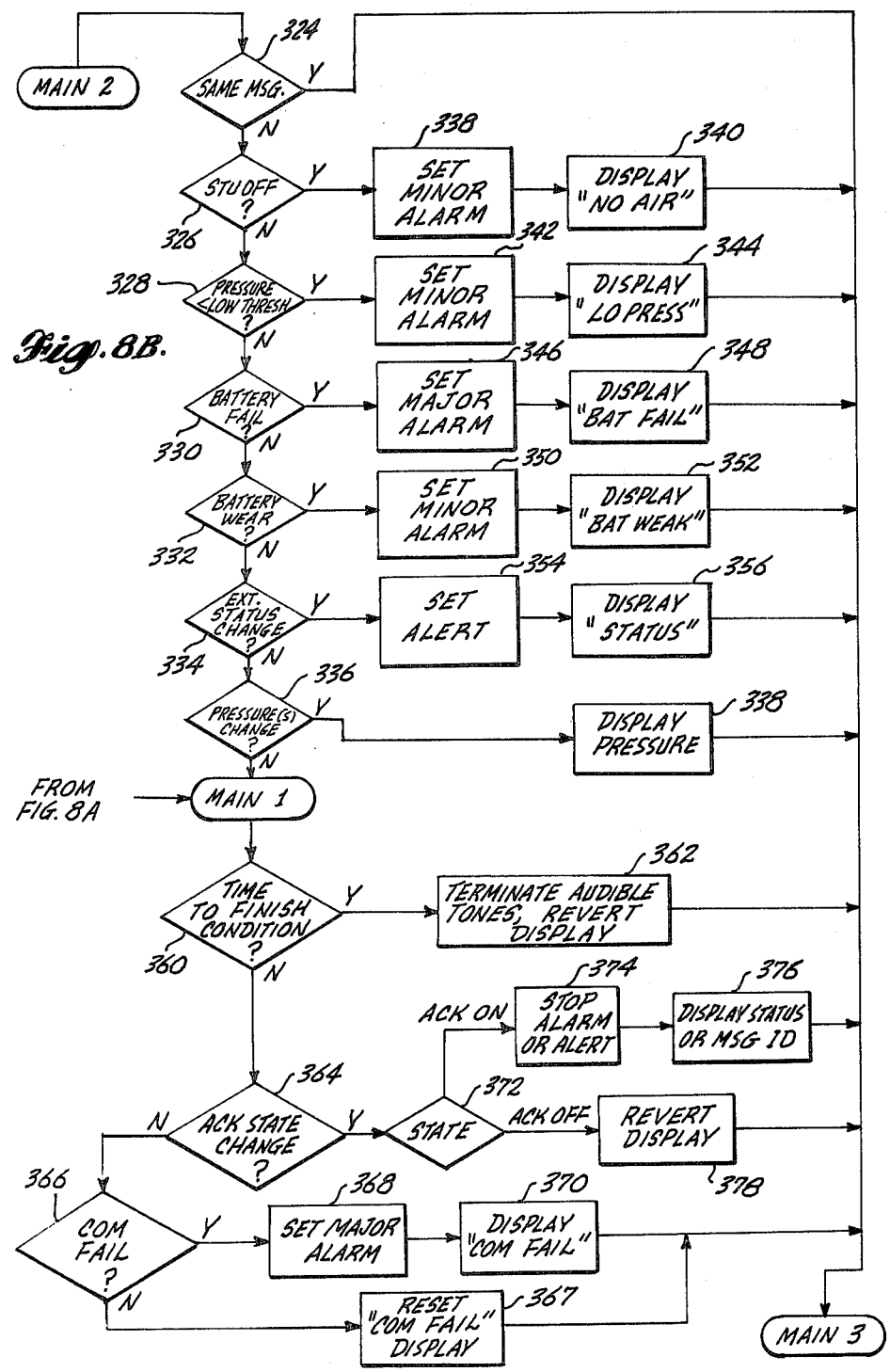

RAILWAY BRAKE PRESSURE MONITOR

FIELD OF THE INVENTION

This invention generally relates to automatic fluid pressure monitoring systems, and more particularly to such systems that monitor and remotely display the air pressure in the brake pipe of a railway train.

BACKGROUND OF THE INVENTION

In a typical railway train braking system, each vehicle is fitted with a brake pipe extending along its length that is coupled to the vehicle's brake cylinders through service and emergency reservoirs and various valves. At each end of the vehicle, the brake pipe is coupled to a "glad hand" connector through an angle cock and a flexible hose. During assembly of a train, the glad hand connectors are interconnected to form a continuous brake pipe extending from the locomotive of the train to the last vehicle thereof. The locomotive includes a source of air pressure that is coupled to the locomotive's brake pipe by various valves, including one or more master control valves accessible to the locomotive engineer.

When the brake pipe interconnections have been made, the angle cock at the far end of the last vehicle is closed and the remaining angle cocks are opened to accordingly form a continuous, closed brake pipe extending from the locomotive to the last vehicle. Through the valves of the locomotive, the brake pipe is charged from the source of air pressure to a predetermined pressure value (e.g., 85 psi). This predetermined brake pipe air pressure causes the pistons in the brake cylinders at each vehicle to be withdrawn to effect a full brake release, and pressurizes the various reservoirs.

When a brake application is desired, one of the master control valves in the locomotive is actuated by the engineer so as to result in a reduction in brake pipe air pressure at the locomotive which thereafter rapidly propagates along the brake pipe. At each vehicle, the valves sense the differential between reservoir air pressure and brake pipe air pressure. When this differential exceeds a predetermined value (e.g., 2 psi), the valves cause the reservoir air pressure to be coupled to the brake cylinders in proportion to the magnitude of the pressure differential to accordingly extend the piston and thus apply the brakes in proportion to the magnitude of the pressure differential. In order to release the brakes after a brake application, the engineer actuates one of the master control valves to cause the brake pipe air pressure to be restored to the full release value (e.g., 85 psi) if a full brake release is desired or to an intermediate value if a partial brake release is desired.

Railway train braking systems may encounter a number of problems in operation.

First, one of the angle cocks between the locomotive and the last vehicle may not have been opened, resulting in inoperable brakes in the portion of the train rearward of the closed angle cock.

Second, there may be a leak in the brake pipe or its associated interconnections at any vehicle rearward of the locomotive. In such a case, the maximum brake pipe air pressure that can be obtained at the vehicles rearward of the leak may not be sufficient to apply or release the associated brakes.

Third, it must be remembered that it is the differential between brake pipe air pressure and reservoir air pressure that causes application and release of the brakes.

Taking as an example a desired full release of the brakes following a brake application, it takes a considerable amount of time for the reservoirs distance from the locomotive to be recharged to the full release brake pipe air pressure. During this time, a desired reapplication of the brakes represented by a brake pipe air pressure reduction of the locomotive may result in the predetermined pressure differential being obtained at vehicles proximate the locomotive but not at vehicles distant from the locomotive. Accordingly, a greater brake pipe air pressure reduction than that normally used must be made to obtain brake application at the distant vehicles. Upon repeated, successive brake applications, the brake pipe air pressure reduction at the locomotive must be progressively increased to obtain brake application at the distant vehicles. At some point, the reservoir air pressures at the distant vehicles will not be sufficient to provide a brake application no matter what the amount of brake pipe air pressure reduction at the locomotive.

From the foregoing discussion, it can be appreciated that it would be extremely useful for the locomotive engineer to be continuously apprised of the lowest air pressure in the brake pipe, i.e., that at the far end of the last vehicle in the train. Heretofore, no means has been developed by which such continuous "last vehicle" brake pipe air pressure monitoring may be made. The prior art does teach many types of apparatus for monitoring brake pipe air pressure; however, most of these prior art apparatus are designed for brake pipe air pressure monitoring at the locomotive. The only exception known to the inventor is a railway brake pressure monitor in which a pressure switch is provided at the last vehicle and coupled with the far end of the brake pipe. When the monitored brake pipe air pressure drops below a predetermined value (e.g., 45 psi) below which the brakes cannot be applied, the pressure switch provides a switching action that is transmitted via radio to a remote location. Although this railway brake pressure monitor provides useful safety information concerning a possible closed angle cock or a leak, it is not capable of providing information useful in assuring the proper and efficiency application and release of the brakes throughout the train.

SUMMARY OF THE INVENTION

The railway brake pressure monitor comprises a sensor/transmitter unit and a remote display unit.

The sensor/transmitter unit is constructed so as to be mounted on the last vehicle of a railway train and coupled with the brake pipe of the last vehicle. The sensor/transmitter unit includes means for providing an output signal proportional to the air pressure within the brake pipe, means for repetitively monitoring the output signal to measure the value of brake pipe air pressure, means for storing the brake pipe air pressure value, means for transmitting a report including the brake pipe air pressure value that is currently stored, and means for enabling the transmission of a report in response to the occurrence of a predetermined event.

The remote display unit is constructed so as to be mounted in the locomotive of the railway train. The remote display unit includes means for receiving each report from the sensor/transmitter unit, means for extracting the brake pipe air pressure value in each report, and means for displaying the brake pipe air pressure value.

In a preferred embodiment, the sensor/transmitter unit receives a plurality of external status input signals, each representing the state of a corresponding external device. The states of the external status input signals are repetitively monitored and stored, and the currently-stored states thereof are included in each report from the sensor/transmitter unit. At the remote display unit, the external status input signal states are extracted from each report and are selectively displayed.

In a preferred embodiment, the sensor/transmitter unit is powered by a battery whose battery voltage is repetitively monitored. The sensor/transmitter unit includes means for determining and storing, from the battery voltage value, a battery status indication representing either an acceptable battery status, a weak battery status, or an about-to-fail battery status. The currently stored battery status indication is included in each report from the sensor/transmitter unit. At the remote display unit, the battery status indication in each report is extracted and selectively displayed.

In a preferred embodiment, the sensor/transmitter unit includes means for storing a sensor/transmitter unit identification number. The stored unit identification number is included in each report from the sensor/transmitter unit. At the remote display unit, the unit identification number in each report is extracted and selectively displayed. The remote display unit also includes means for storing a sensor/transmitter unit identification number. A report from the sensor/transmitter unit is recognized as valid only in the event that the unit identification number in the report is the same as the unit identification number stored in the remote display unit.

The transmission of a report by the sensor/transmitter unit may be triggered upon occurrence of any of the following events:

the brake pipe air pressure value has remained below a predetermined value (e.g., 5 psi) for an extended period of time (e.g., 5 minutes);

the brake pipe air pressure value has changed by more than a predetermined amount (e.g., 5 psi) since the last report by the sensor/transmitter unit;

the brake pipe air pressure value has changed by more than a predetermined amount (e.g., 2 psi) since the last report and a predetermined interval (e.g., 5 seconds) has elapsed since that last report;

any one of the external status input signals has changed state since the last report; or, a random interval (e.g., in the range of 55-65 seconds) has elapsed since the last report.

In addition to display of the brake pipe air pressure, and the selective display of the external status input signal states and the battery status indication, the remote display unit may provide a corresponding alarm upon occurrence of any of the following events:

the brake pipe air pressure value in any report is less than a predetermined amount (e.g., 45 psi);

the transmission of a report from the sensor/transmitter unit has been triggered by the brake pipe air pressure value remaining below a predetermined value for an extended period of time;

any of the external status input signal states in the report have changed since the last report;

the report contains a weak or an about-to-fail battery status indication; or, there has been an absence of valid reports from the sensor/transmitter unit for a predetermined interval (e.g., three minutes).

Within the remote display unit, manually-actuable means are provided for resetting each corresponding alarm.

BRIEF DESCRIPTION OF THE DRAWINGS

The invention can thus be understood by reference to the following portion of the specification, taken in conjunction with the accompanying drawings in which:

FIG. 1 is a pictorial view of a locomotive and of the last vehicle of a train, illustrating a remote display unit located in the locomotive cab and a sensor/transmitter unit located at the last vehicle;

FIG. 2 is a plan view of the coupler at the last vehicle, particularly illustrating the mounting of the sensor/transmitter unit to that coupler and the interconnection of the sensor/transmitter unit with the brake pipe;

FIG. 3 is an exploded, pictorial view of the coupler, the sensor/transmitter unit, and its mounting assembly;

FIG. 7 is an electrical block diagram of the remote display unit including a microcomputer, and FIG. 7A is a schematic illustration of the display afforded thereby; and, FIGS. 8A and 8B are a flow chart of the program steps undertaken by the microcomputer of the remote display unit in a MAIN routine.

DESCRIPTION OF THE PREFERRED EMBODIMENT

Figure 4:
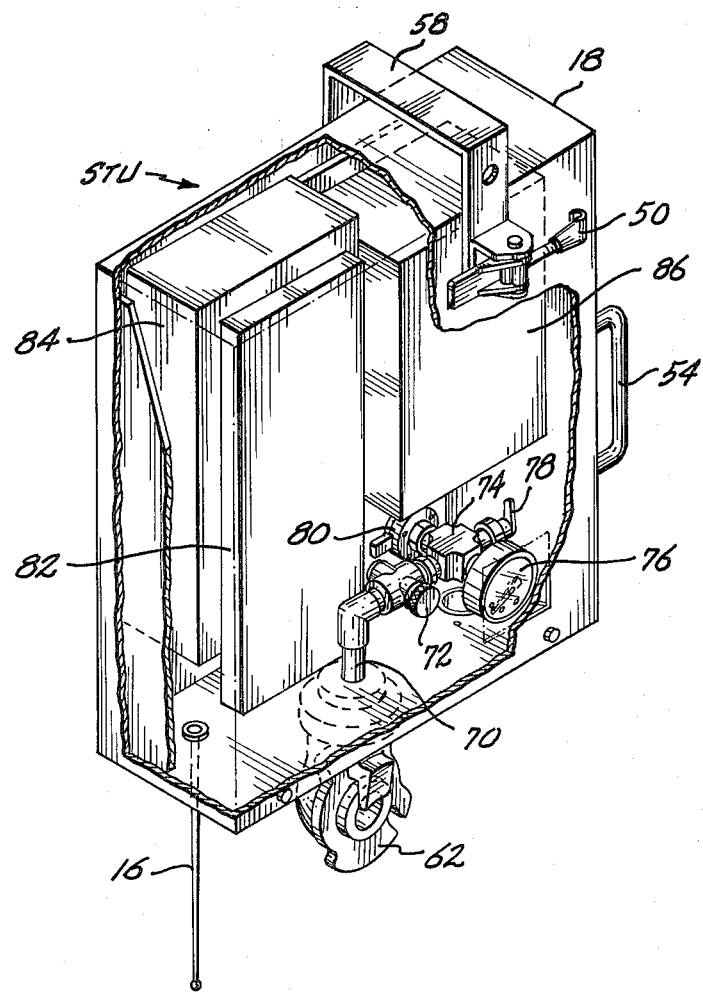
FIG. 4 is a partially cut-away pictorial view of the sensor/transmitter unit.

Referring now to FIG. 1, the railway brake pressure monitor of the present invention includes a remote display unit (RDU) mounted in the cab of a locomotive 10 in a location accessible to the locomotive engineer, and a sensor/transmitter unit (STU) mounted on the rear coupler of the last vehicle 12 of the train pulled by the locomotive 10. The RDU unit and the STU unit are provided with respective antennas 14, 16 for providing radio frequency communications therebetween. The STU unit is coupled to the train's brake pipe at the rear of last vehicle 12 (and to a second brake pipe of the train in the event the train is provided with a dual braking system.) The STU unit functions to measure the brake pipe air pressure in the brake pipe(s) coupled thereto, to monitor various external status inputs provided by sensors not forming part of the present invention, and to transmit the measured brake pipe air pressure(s) and monitored external status inputs, along with other information, to the RDU unit. The RDU unit functions to display the data received from the STU unit and to provide various alerts and alarms, with the displays, alerts, and alarms being provided in a manner designed to assist the locomotive engineer in use of the railway train braking system.

Referring now to FIGS. 2–3, the embodiment of the STU unit illustrated therein is particularly adapted for measuring the brake pipe air pressure in a single brake pipe. It will be appreciated, however, from the following discussion that the STU unit can be readily modified to measure the brake pipe air pressure in a plurality of brake pipes.

The components of the STU unit are mounted in and on a housing 18. A mounting assembly 20, that is secured to coupler 22 at the rear of last vehicle 12, permits housing 18 to be readily mounted on and removed from coupler 22. Mounting assembly 20 includes an open-sided rectangular portion 24 that fits over the knuckle 26 of coupler 22. A draw bar 28 fits through aligned openings 30 (only one of which is illustrated) in the top and bottom walls of rectangular portion 24 and through flag mounting hole 32 in knuckle 26, and is retained in place by enlarged head 34 at its upper end and by a clip 36 passing through a transverse bore 38 at its lower end. Once mounting assembly 20 has been mounted on knuckle 26 in the foregoing manner, mounting assembly 20 is secured thereto by a bolt 40 threadingly engaged in the rear side wall of rectangular portion 24 that bears against an exterior face of knuckle 26 to force a bar 42 secured to and extending from the inner front side wall of rectangular portion 24 into engagement with an opposing, interior face of knuckle 26.

Mounting assembly 20 is provided with a rearwardly-opening U-shaped bracket 44 that fits between knuckle 26 and an opposing portion of coupler 22. Housing 18 is received within U-shaped bracket 44 and is secured thereto by a lower projection 46 of housing 18 that fits into a flange 48 at the lower end of U-shaped bracket 44 and by a pair of releasable latches 50 secured to respective side walls of housing 18 at the upper ends thereof that engage corresponding clips 52 secured to respective side walls of U-shaped bracket 44 at the upper ends thereof. Housing 18 is provided with a handle 54 extending from its front side wall for transporting the STU unit upon removal from mounting assembly 20, which handle 54 fits through a corresponding opening 56 in the front wall of U-shaped bracket 44. In order to prevent unauthorized removal of the STU unit, housing 18 is provided with a bracket 50 at its upper end and U-shaped bracket 44 is provided with an arm 60 at its upper end, with bracket 58 and arm 60 having openings therein that are aligned when the STU unit is mounted through which a padlock may be passed.

A glad hand connector 62 is mounted on and extends from the bottom wall of housing 18. Glad hand connector 62 is adapted to mate with a corresponding glad hand connector 64 of last vehicle 12 that is coupled to the brake pipe (not illustrated) through a flexible hose 66 and an angle cock 68. When glad hand connectors 62 and 64 are assembled and angle cock 68 is opened, the STU unit is accordingly in fluid communication with the brake pipe.

With additional reference now to FIG. 4, glad hand connector 62 is coupled by piping 70 within housing 18 to a quick disconnect fluid connector 72 that is provided for the purpose of permitting a pressure meter to be coupled to the brake pipe for calibration. Connector 72 in turn is coupled to a union 74 that receives a conventional pneumatic pressure gage 76 (that may be viewed through a corresponding opening in the side wall of housing 18), a pressure switch 78, and a pressure transducer 80. Pressure switch 78 is of the type that provides a switch actuation when the brake pipe air pressure crosses a predetermined threshold value, as discussed hereinafter, and pressure transducer 80 is of the type that provides an electrical output signal proportional to the brake pipe air pressure, as also discussed hereinafter.

Pressure switch 78 and pressure transducer 80 are coupled to an electronic circuit board module 82 that also receives inputs from a plurality of external status inputs. Preferably, these external status inputs comprise terminals (not illustrated) to which are connected various sensors, each providing an ON and an OFF indication of the status of a particular sensed parameter that is desired to be transmitted to the locomotive cab. Electronic circuit board module 82 provides an output signal, representing the data to be transmitted to the locomotive cab, to a conventional radio transmitter 84 that is connected to antenna 16. Both electronic circuit board module 82 and radio transmitter 84 are powered by a battery pack 86 containing rechargable batteries.

Figure 5:
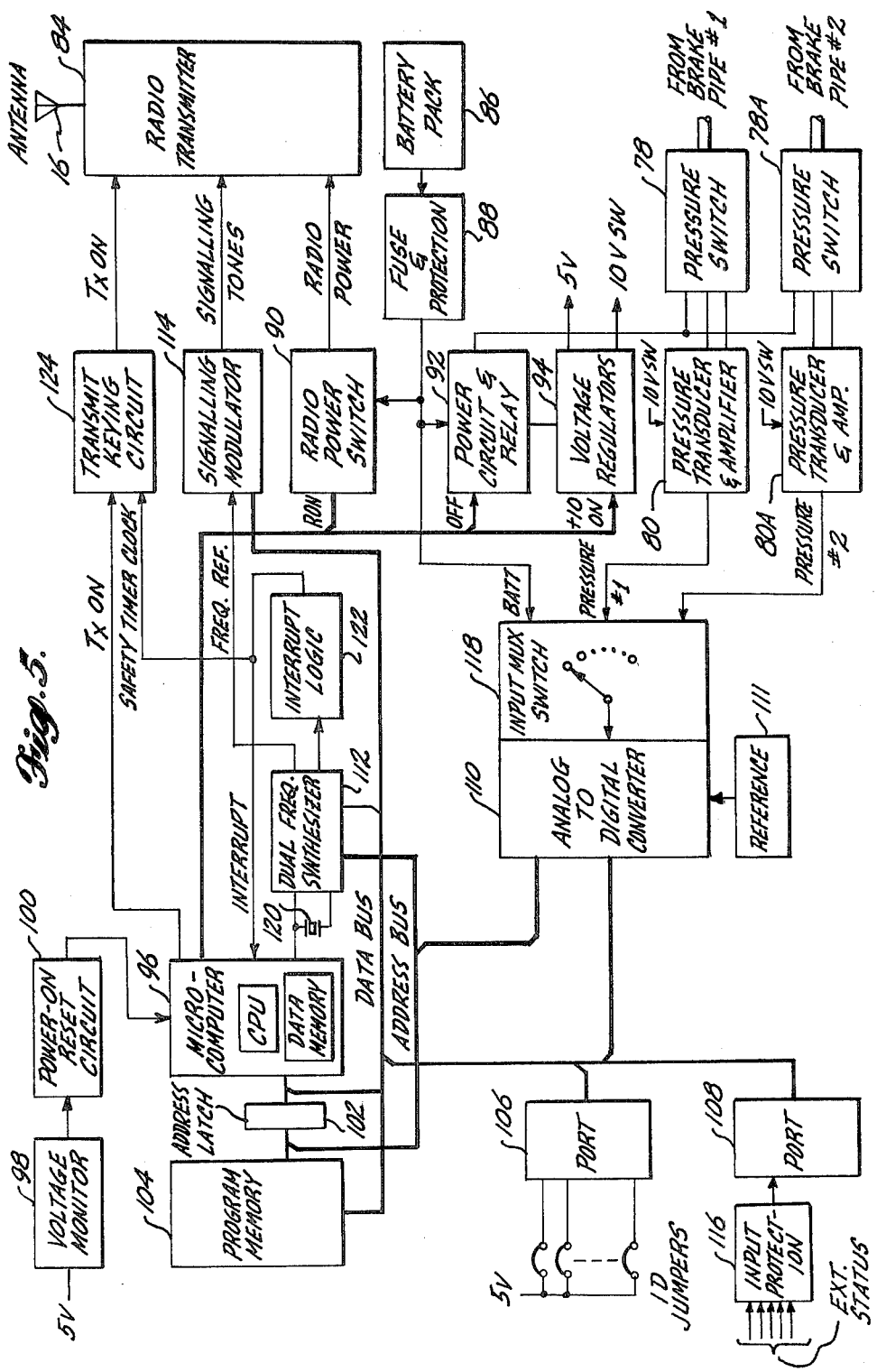
FIG. 5 is an electrical block diagram of the sensor/transmitter units including a microcomputer.

Referring now to the electrical block diagram of FIG. 5, the majority of the components illustrated therein are located in electronic circuit board module 82 with the exception of pressure switch 78 and pressure transducer 80 for a first brake pipe of the train (brake pipe #1), pressure switch 78A and pressure transducer 80A for a second brake pipe of the train (brake pipe #2), radio transmitter 84 and its associated antenna 16, and battery pack 86. The inputs to electronic circuit board module 82 comprise: the switch actuations of pressure switches 78 and 78A (ON); analog output signals from pressure transducers 80 and 80A and their corresponding amplifiers (PRESSURE #1 and PRESSURE #2); a five-digit STU identification number obtained from selectively-installed ID JUMPERS; and, the plurality of external status inputs (EXT. STATUS). The electronic circuit board module 82 receives a battery voltage (BATT) from battery pack 86 via a fuse and protection circuit 88. The outputs from electronic circuit board module 82 comprise: a power voltage to radio transmitter 84 (RADIO POWER); a control signal enabling the transmitter therein (TX ON); and, the data to be transmitted (SIGNALLING TONES).

The STU unit performs the following primary functions.

In the event that either brake pipe air pressure exceeds the threshold value (e.g., 10 psi) of pressure switches 78 and 78A, power is applied to the various components of electronic circuit board module 82. Upon application of power, the STU status is set to ON. Periodically thereafter, e.g., at one second intervals, the STU unit measures, converts to digital form, and stores the first brake pipe air pressure (PRESSURE #1) and the second brake pipe air pressure (PRESSURE #2), and reads and stores the various external status inputs.

The STU unit transmits a report to the RDU unit upon occurrence of any of the following events:

both brake pipe air pressures have remained below a predetermined value (e.g., 5 psi) representing "no air" in the associated brake pipes for an extended period of time (e.g., 5 minutes);

either brake pipe air pressure has changed by more than a predetermined amount (e.g., 5 psi) since the last report by the STU unit;

either brake pipe pressure has changed by more than a predetermined amount (e.g., 2 psi) since the last report and a predetermined interval (e.g., 5 seconds) has elapsed since that last report;

any one of the various external status inputs has changed since the last report; or a random interval (e.g., in the range of 55–65 seconds) has elapsed since the last report.

Each report includes multiple identical messages in succession to insure reliability of data transmission. Each message consists of the following, in sequence: a bit synchronizing pattern; a frame synchronizing pattern; and, a data block.

Each data block includes: the STU type or model number; the STU identification number; the first brake pipe air pressure; the second brake pipe air pressure; a battery status indication (acceptable, weak, or about to fail); the STU status (whether ON or OFF); and, the external status inputs (whether ON or OFF).

Transmission of each report is accomplished by the use of synchronized frequency shift keying, at a selectable baud rate (e.g., 1200 baud), of a carrier having an appropriate RF frequency.

In order to conserve battery pack 86, power is applied to each of pressure transducers 80 and 80A shortly before, and is removed from each of the pressure transducers shortly after, each pressure measurement. Likewise, power is applied to radio transmitter 84 shortly before, and is removed from the radio transmitter shortly after, each report transmission.

The STU unit includes a microcomputer. Conservation of the battery pack is enhanced by normally maintaining the microcomputer in a "halt" mode, wherein no program instructions are being executed, and by permitting the microcomputer to execute program instructions only at predetermined intervals (e.g., 150 times per second). Finally, power is removed from all components of the STU unit and the STU status is set to OFF in the event that both brake pipe air pressures have remained below a predetermined value (e.g., 5 psi) for an extended period of time (e.g., 5 minutes).

Returning to FIG. 5, the battery voltage BATT is supplied to a radio power switch 90 and to a power circuit and relay 92. In their normal or rest states, switch 90 and circuit and relay 92 are deactuated. When either brake pipe air pressure rises above the threshold value (e.g., 10 psi) of the corresponding pressure switch 78 or 78A, the resultant switch action (ON) actuates circuit and relay 92 which responsively couples the battery voltage to voltage regulators 94. Two outputs are provided by voltage regulators 94: a 5 V output that is provided whenever circuit and relay 92 is actuated; and, a 10 V SW output that is provided only when a +10 ON signal to voltage regulators 94 has a predetermined logic level. The 5 V output is supplied to the majority of the illustrated components of the STU unit and accordingly powers those components.

These components include a single-chip microcomputer 96 including a CPU and a data memory. Upon application of power to the STU unit, the resultant rise in voltage on the 5 V output is detected by a voltage monitor 98 which responsively causes a power-on reset circuit 100 to apply a reset signal to microcomputer 96, which accordingly initializes itself and begins its operations. A DATA BUS couples microcomputer 96 with an address latch 102, a program memory 104, a port 106, a port 108, an analog-to-digital converter 110, and a signalling modulator 114, and an ADDRESS BUS couples address latch 102 with program memory 104, analog-to-digital converter 110, and dual frequency synthesizer 112. Program memory 104 contains the set of program instructions to be executed by the CPU within microcomputer 96, and the set of program instructions will be discussed in more detail hereinafter with reference to FIGS. 6A–6D. Port 106 is coupled to the 5 V output through the ID JUMPERS, whereby the installation or removal of each jumper signifies a corresponding logic level of one bit of the STU identification number. Port 108 is coupled to the external status inputs (EXT. STATUS) through an input protection circuit 116 that filters out potentially damaging transients on the external status inputs. Analog-to-digital converter 110 is selectively coupled to the BATT, PRESSURE #1, and PRESSURE #2 signals through an input multiplexer and switch 118, and additionally has supplied thereto a stable voltage reference 111 for use in converting the analog input signals thereto into corresponding digital signals.

A crystal 120 provides a stable frequency reference for the timing operations of the CPU within microcomputer 96 and for dual frequency synthesizer 112. Dual frequency synthesizer 112 has two outputs: a first output going to an interrupt logic circuit 122 that responsively provides an output signal at a predetermined frequency (e.g., 150 Hz) that is supplied as an INTERRUPT signal to the interrupt input of microcomputer 96 and as a SAFETY TIMER CLOCK signal to an input of a transmit keying circuit 124; and, a second output at a frequency that is an integral multiple of both FSK frequencies and that establishes the selected baud rate, supplied as a FREQ. REF. signal to an input of signalling modulator 114. Microcomputer 96 also provides a TX ON signal to transmit keying circuit 124 which provides a corresponding TX ON signal to radio transmitter 84. Depending upon the logic level of the TX ON signal, radio transmitter 84 is caused to produce or not produce its carrier output. The data to be transmitted is supplied to radio transmitter 84 as the SIGNALLING TONES signal from signalling modulator 114.

Microcomputer 96 also supplies an R ON signal to radio power switch 90, an OFF switch to power circuit and relay 92, and a +10 ON signal to voltage regulators 94. Depending upon the logic level of the R ON signal, switch 90 is either actuated or deactuated so as to correspondingly supply a power voltage to and remove the power voltage from radio transmitter 84. Depending upon the logic level of the +10 ON signal, voltage regulators 94 either enable or disable the 10 V SW output thereof which is coupled to pressure transducers 80 and 80A, and their associated amplifiers. Not illustrated in FIG. 5 are read, write and control signals supplied by microcomputer 96 to the various components connected to the DATA BUS and the ADDRESS BUS that are required to coordinate the addressing of those components by microcomputer 96 through addresses placed on the ADDRESS BUS, and to coordinate the transfer of data between microcomputer 96 and those components on the DATA BUS.

The operation of the STU unit can best be understood by reference to the program steps undertaken thereby, as will now be discussed in conjunction with the flow charts of FIGS. 6A–6D.

Figure 6A:
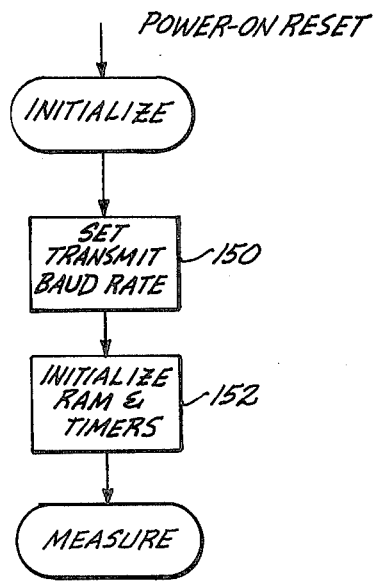
FIGS. 6A through 6D are flow charts illustrating the program steps undertaken by the microcomputer of the sensor/transmitter unit in respective INITIALIZE, MEASURE, DECIDE and TRANSMIT routines.

Upon application of power to the STU unit (e.g., when either brake pipe air pressure rises above 10 psi), the corresponding reset signal from power-on reset circuit 100 causes microcomputer 96 to enter an INITIALIZE route (FIG. 6A). In initial step 150, microcomputer 96 sets the transmit baud rate by supplying appropriate data to dual frequency synthesizer 112 which provides a corresponding FREQ. REF. signal to signalling modulator 114. In step 152, microcomputer 96 initializes its data memory by clearing various bytes therein reserved for the data to be monitored and transmitted, and by clearing and restarting various timers. These timers include a one second timer, a five second timer, a random timer that times out randomly in the range of 55 to 65 seconds, and a five minute timer. In addition, microcomputer 96 sets the status of the STU unit to ON.

Figure 6B:
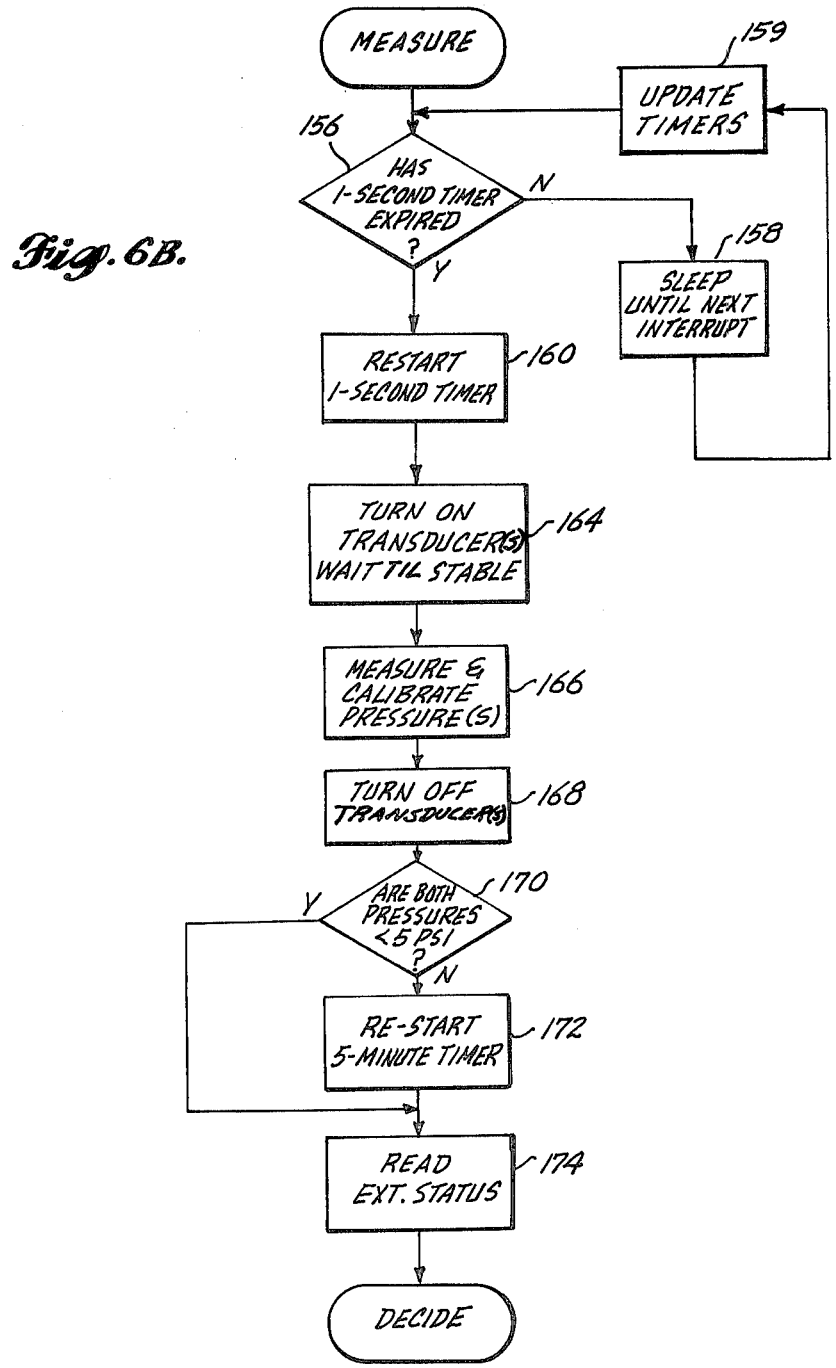

From step 152, microcomputer 96 proceeds to a MEASURE routine (FIG. 6B). In step 156, microcomputer 96 determines if the one second timer has expired. As previously discussed, measurement of the brake pipe air pressures is made at one second intervals. If the determination in step 156 is negative, microcomputer 96 proceeds in step 158 to issue itself a "halt" instruction which terminates further processing, and awaits the receipt of a successive pulse in the INTERRUPT signal from interrupt logic circuit 122. These pulses may be provided at any convenient rate, such as 150 times per second. Upon receipt of the next pulse in the INTERRUPT signal, microcomputer 96 updates its timers in step 159 and returns to step 156 to determine if the one second timer has expired. If the determination in step 156 is again negative, microcomputer 96 returns to step 158 to await a successive pulse in the INTERRUPT signal. The aforementioned process repeats until the one second timer has expired and the determination in step 156 is affirmative. At this time, microcomputer 96 proceeds in step 160 to restart its one second timer.

From step 160, microcomputer 96 in step 164 controls the logic level of the +10 ON signal to voltage regulators 94 so as to enable the 10 V SW output thereof to accordingly apply power to pressure transducers 80 and 80A and their associated amplifiers. After waiting for an appropriate period chosen to permit the pressure transducers and amplifiers to stabilize, microcomputer 96 in step 166 measures, calibrates and stores the two brake pipe air pressures. During each measurement of the various analog input signals including PRESSURE #1 and PRESSURE #2, microcomputer 96 causes input multiplexer and switch 118 to connect the appropriate analog input signal to analog-to-digital converter 110, whereupon analog-to-digital converter 110 converts the analog value of that input signal into corresponding digital form by comparison with the stable voltage reference 111 and transmits the corresponding digital form as data on the DATA BUS to microcomputer 96. Through control of the logic level of the +10 ON signal, microcomputer 96 then removes power from the pressure transducers and amplifiers in step 168.

In step 170, microcomputer 96 determines if both pressures are less than 5 psi. If the determination in step 170 is negative, microcomputer 96 restarts the five minute timer in step 172 and then proceeds to step 174. If the determination in step 170 is affirmative, however, microcomputer 96 proceeds directly to step 174 without restarting the five minute timer. In step 174, microcomputer 96 reads and stores the status of the various external status inputs (obtained through port 108).

Figure 6C:
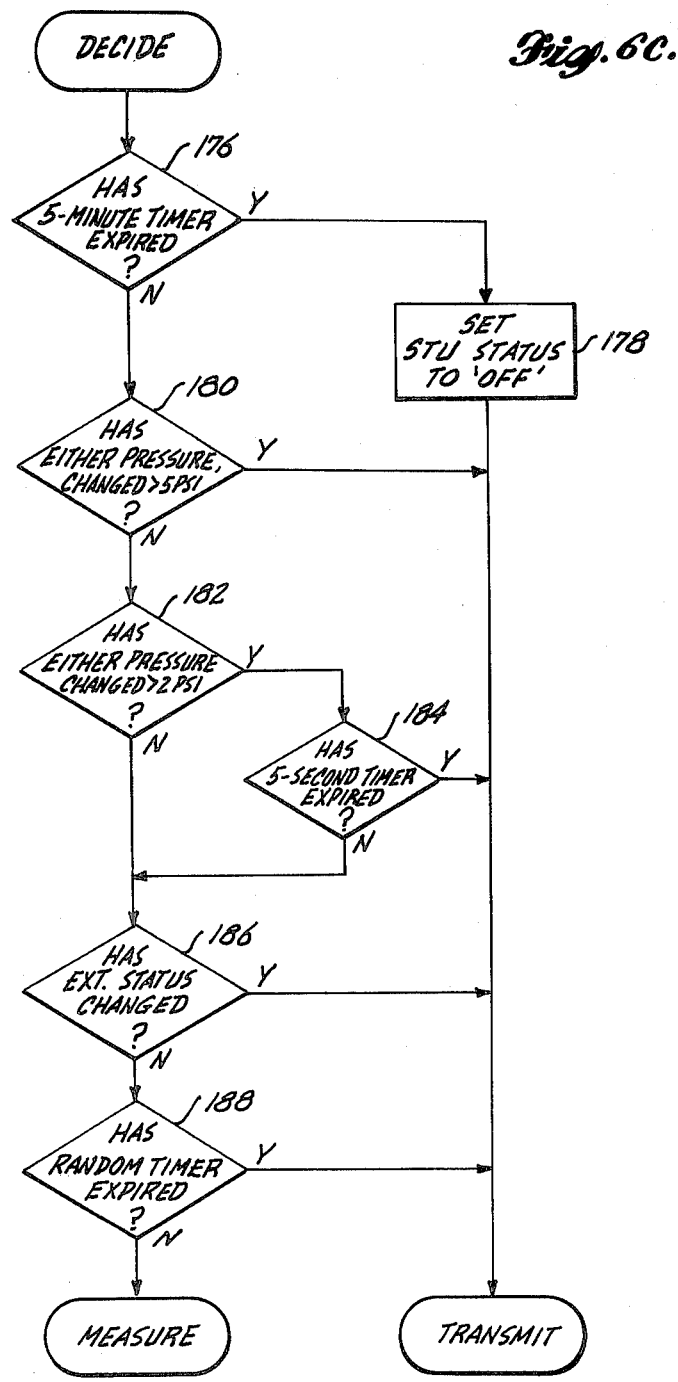
Figure 6D:
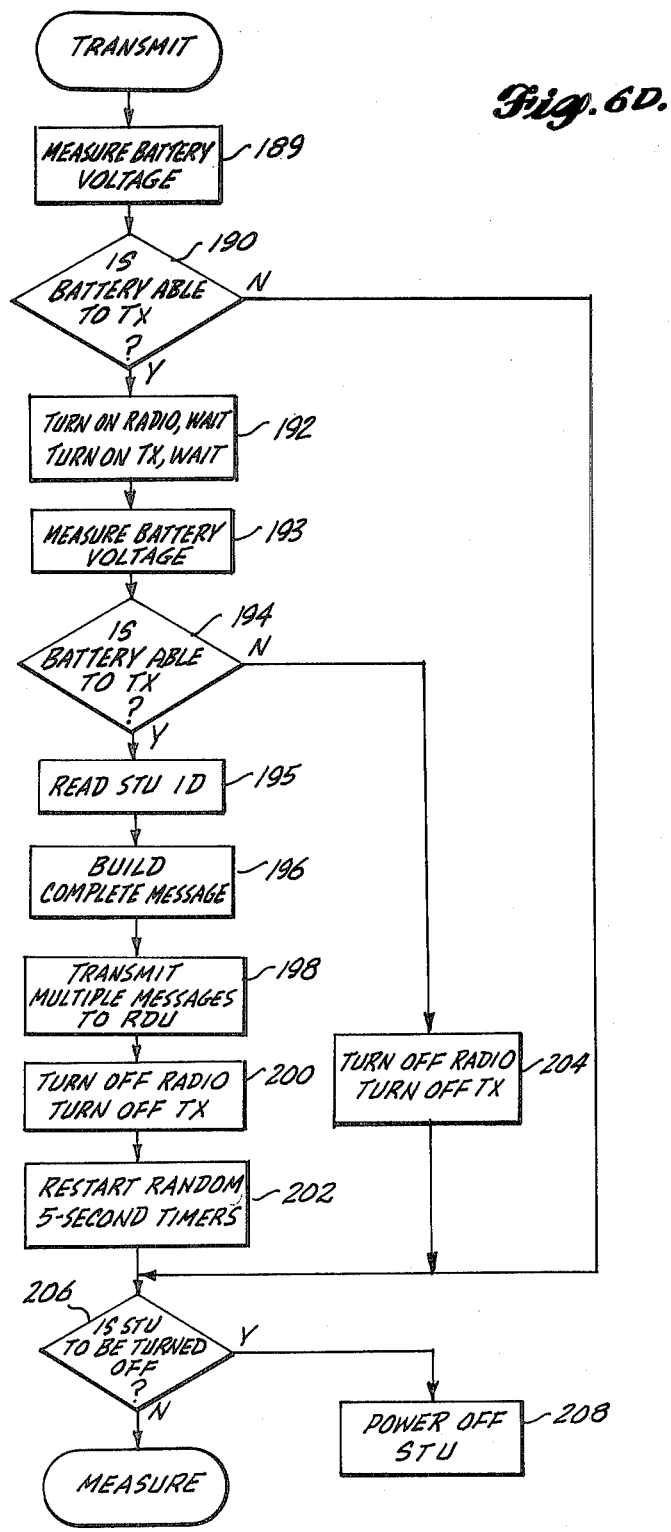

From step 174, microcomputer 96 proceeds to a DECIDE routine (FIG. 6C). In step 176, microcomputer 96 determines if the five minute timer has expired. If the determination in step 176 is affirmative, both brake pipe air pressures have remained below 5 psi for five minutes (reference steps 170 and 172, FIG. 6B). Accordingly, microcomputer 96 proceeds in step 178 to set the status of the STU unit to OFF, and then proceeds to a TRANSMIT routine (FIG. 6D). If the determination in step 176 is negative, microcomputer 96 proceeds in step 180 to determine if either brake pipe air pressure has changed by more than 5 psi from the value thereof at the time of the last report by the STU unit. If the determination in step 180 is affirmative, microcomputer 96 proceeds to the TRANSMIT routine. If the determination in step 180 is negative, microcomputer 96 proceeds in step 182 to determine if either pressure has changed by more than 2 psi since the last report by the STU unit. If the determination in step 182 is affirmative, microcomputer 96 proceeds in step 184 to determine if the five second timer has expired. As previously discussed, the five second timer is started upon initialization of the STU unit, and as subsequently discussed, the five second timer is restarted upon transmission of a report by the STU unit. If the determination in step 184 is affirmative, microcomputer 96 proceeds to the TRANSMIT routine. Accordingly, it will be appreciated that a change in either brake pipe air pressure by more than 5 psi will immediately trigger a report by the STU unit, but that a change in either brake pipe air pressure by more than 2 psi but less than 5 psi will trigger a report by the STU unit only in the event that a period of five seconds has elapsed from the last report. This five second period is chosen to avoid interference with a report transmission by another STU unit mounted on a passing train.

If the determination in either of steps 182 or 184 is negative, microcomputer 96 proceeds in step 186 to determine if any of the external status inputs has changed since the last report by the STU unit. If the determination in step 186 is affirmative, microcomputer 96 proceeds to the TRANSMIT routine. If the determination in step 186 is negative, microcomputer 96 proceeds in step 188 to determine if the random timer has expired. As previously discussed, the random timer is started upon initialization of the STU unit, and as subsequently discussed, the random timer is restarted upon transmission of a report by the STU unit. If the determination in step 188 is affirmative, microcomputer 96 proceeds to the TRANSMIT routine. Accordingly, a report is triggered by the random timer at a random interval following the last report by the STU unit even though no significant change has occurred in the brake pipe air pressures or in the external status inputs since that last report. The random interval is provided to minimize the chance occurrence of simultaneous transmissions by two proximate STU units. If the determination in step 188 is negative, none of the events triggering a report by the STU unit have occurred whereupon microcomputer 96 returns to the MEASURE routine.

Referring now to the TRANSMIT routine (FIG. 6D), microcomputer 96 first measures and stores the battery voltage BATT in step 189 and then determines in step 190 if the battery voltage is sufficient to permit radio transmitter 84 to provide a transmission. If the determination in step 190 is affirmative, microcomputer 96 proceeds in step 192 to cause power to be applied to radio transmitter 84 (through control of the logic level of the R ON signal) and causes radio transmitter 84 to transmit a carrier (through control of the logic level of the TX ON signal). After these events, microcomputer 96 waits for an appropriate time sufficient to allow radio transmitter 84 to stabilize and then proceeds in step 193 to measure and store the battery voltage. In step 194, microcomputer 96 determines if the battery voltage (given the additional load of radio transmitter 84) is sufficient to allow radio transmitter 84 to transmit. If the determination in step 194 is affirmative, microcomputer 96 proceeds in step 195 to read and store the STU identification number (obtained through port 106).

As previously described, the data block within the message includes the STU type or model number (which is obtained from program memory 104), the STU identification number, the two brake pipe air pressures, the battery status (which has been classified by microcomputer 96 from the battery voltages measured in steps 189 and 193 as either acceptable, weak or about to fail), the STU status (whether ON or OFF), and the various external status inputs (each of which is either ON or OFF). This data is represented by a predetermined number of bits, preceded by and followed by appropriate error checking bits in the data block. The message as constructed consists of a predetermined number of sequential bits consisting of the bit synchronization pattern, the frame synchronization pattern, and the data block. Thereafter, microcomputer 96 proceeds in step 198 to cause a report containing multiple and successive occurrences of the thus-constructed message to be transmitted to the RDU unit by radio transmitter 84. In doing so, the message is provided by microcomputer 96 to signalling modulator 114 via the DATA BUS in successive parallel bytes. Signalling modulator 114 functions to order these bytes into sequential bit form and to convert each bit to its corresponding FSK frequency, using the FREQ. REF. signal. In a typical FSK scheme, a logic one comprises one cycle at a frequency corresponding to the selected baud rate (e.g., 1200 Hz for 1200 baud), and a logic zero comprises one and one-half cycles at one and one-half times that frequency (e.g., 1800 Hz for 1200 baud). The bit-corresponding frequencies are supplied as the SIGNALLING TONES signal to radio transmitter 84 and modulated thereby onto the carrier being transmitted via antenna 16. After transmission of the report, microcomputer 96 proceeds in step 200 to terminate the carrier and to remove power from radio transmitter 84, by control of the logic levels of the TX ON and R ON signals, and then proceeds in step 202 to restart the random and five second timers.

If the battery voltage is not sufficient to permit transmission, either before the turning on of radio transmitter 84 or subsequent thereto, the determinations in steps 190 or 194 will be negative whereupon microcomputer 96 bypasses the steps just described in the TRANSMIT routine. Further, the determination of an insufficient battery voltage subsequent to turning on of radio transmitter 84 requires microcomputer 96 to turn off the carrier therefrom and to remove power from radio transmitter 84, which microcomputer 96 proceeds to do in step 204 following a negative determination in step 194. From a negative determination in step 190 or from steps 202 or 204, microcomputer 96 proceeds in step 206 to determine if the STU status is OFF (reference step 178 in the DECIDE routine, FIG. 6C). If the determination in step 206 is negative, microcomputer 96 returns to the MEASURE routine. If the determination in step 206 is affirmative, microcomputer 96 proceeds in step 208 to remove power from the STU unit by appropriate control of the logic level of the OFF signal supplied to circuit and relay 92.

Due to various component failures, microcomputer 96 may erroneously provide the TX ON signal for an extended period of time. In order to avoid the extended transmission of a carrier in such an event, transmit keying circuit 124 includes a safety timer that is clocked by the SAFETY TIMER CLOCK signal from interrupt logic circuit 122. The safety timer is restarted whenever the TX ON signal from microcomputer 96 has a first logic level representing the initiation of carrier transmission and is stopped whenever the TX ON signal from microcomputer 96 has a second logic level representing the termination of carrier transmission. In the event that the TX ON signal from microcomputer 96 fails to return to its second logic level within a predetermined amount of time (about one second) following its first logic level, the safety timer times out to disable the production of the TX ON signal by transmit keying circuit 124.

Referring now to the electrical block diagram of the RDU unit in FIG. 7, the report transmitted by the STU unit is received by antenna 14 coupled to a radio receiver 250 that is continuously powered from the locomotive's power source. Radio receiver 250 functions in a conventional manner to demodulate the FSK signalling tones from the carrier and to supply the demodulated signalling tones (RX AUDIO) as a first input to the RDU unit. A second input to the RDU unit is provided by a plurality of thumb wheel switches 252 which can be manipulated by the locomotive engineer to set a five-digit STU identification number corresponding to that of the STU unit at the rear of last vehicle 12 (or to that of any other STU unit). A third input to the RDU unit is provided by a jumper 254. Depending upon whether jumper 254 has been installed or not installed, the display of the RDU unit will be respectively in units of psi or kpa (kilo-pascals). A fourth input to the RDU unit is provided by an ACK pushbutton switch that is used by the locomotive engineer to acknowledge various alerts and alarms. The outputs from the RDU unit comprise audible tones produced by an audible beeper 256 and an alphanumeric display provided by a display module 258.

The display afforded by display module 258 is seen in FIG. 7A to comprise an alphanumeric eight-digit display 258A. The first brake pipe air pressure appears in the right three digits of display 258A, a status changed indication appears in the next-left digit of display 258B, the second brake pipe air pressure appears in the next-left three digits of display 258A, and a battery indication appears in the left digit of display 258A. In a normal mode of display 258A, the first and second brake pipe air pressures and the battery indication are displayed and the status changed indication is blank. In the event the report from the STU unit contains an "acceptable" battery status, the battery indication is blank. In the event the report from the STU unit contains a "weak" battery status, a "B" appears in the battery indication. In the event the report from the STU unit contains an "about to fail" battery status, a "F" appears in the battery indication. Whenever any of the external status inputs has changed since the last report from the STU unit, a "S" appears in the status changed indication. To obtain a display of the external status inputs, the locomotive engineer actuates the ACK switch whereupon the states of the various external status inputs are displayed in the right five digits of display 258A. If the external status input is ON, an asterisk is displayed in the corresponding digit of display 258A, and if the external status input is OFF, the corresponding digit of display 258A is blank. When the ACK switch is released, display 258A reverts to a display of the brake pipe air pressures and the status changed indication is blank.

Certain information within the reports from the STU unit and certain conditions trigger various alert and alarm conditions of the RDU unit.

In any alert condition, a short audible tone is produced by audible beeper 256 and a word signifying the alert condition briefly appears (e.g., for a period of two seconds) in the digits of display 258A. The alert conditions (and the corresponding alert words displayed) are:

STATUS—whenever any of the external status inputs has changed state since the last report by the STU unit. Following this alert, display 258A reverts to a display of the first brake pipe air pressure and a "S" is displayed in the status change indication.

MODEL #—upon application of power to the RDU unit. Following this alert, display 258A is blank until the receipt of a report from the STU unit.

(MESSAGE ID#)—even though reports containing valid messages are being received by the RDU unit, the STU identification number therein fails to correspond with the identification number set by switches 252 in the RDU unit and no valid message containing that identification number has been received for a predetermined period of time (e.g., three minutes). This alert is triggered by actuation of the ACK switch to display the identification number in the last report, whereupon display 258A reverts to a display of the brake pipe air pressures.

The existence of a minor alarm condition causes a series of audible tones to be produced by audible beeper 256 at a predetermined rate (e.g., 1 Hz) for a predetermined period of time (e.g., five seconds) and causes a corresponding alarm word to be flashed on display 258A at that rate for that period of time. The minor alarm conditions (and the corresponding alarm words displayed) are:

NO AIR—the report from the STU unit indicates that the STU status is OFF, representing that both brake pipe air pressures have been below 5 psi for five minutes.

LO PRESS—the report from the STU unit indicates that either of the brake pipe air pressures is less than the predetermined threshold (e.g., 45 psi) below which the braking system is unable to effect a braking action.

BAT WEAK—upon the first report from the STU unit containing a "weak" battery status indication.

Any of the minor alarms may be reset prior to the five second period upon actuation by the locomotive engineer of the ACK switch. Upon time-out or ACK switch reset, display 258A reverts to a display of the first brake pipe air pressure. In the event of the NO AIR condition, that alarm word continues to be displayed until the receipt of a subsequent valid report from the STU unit containing a message in which the STU status is ON.

The existence of a major alarm condition causes a series of audible tones to be produced by audible beeper 256 at a different rate (e.g., 2 Hz) than that used for the minor alarm conditions, for a predetermined period of time (e.g., five seconds), and causes a corresponding alarm word to be flashed by display 258A at that rate for that period. The major alarm conditions (and the corresponding alarm words displayed) are:

COM FAIL—in the event that no valid reports have been received from the STU unit for three minutes.

BAT FAIL—upon the first report from the STU unit containing an "about to fail" battery status.

FAULT #—in the event of a fault in the data memory of the RDU unit.

Each of the major alarm conditions may be reset by actuation of the ACK switch prior to the expiration of the five second period. Upon time-out or ACK switch reset, display 258A reverts to a display of the brake pipe air pressures in the event that the major alarm condition is BAT FAIL. In the event that the major alarm condition is COM FAIL, display 258A continues to display that alarm word until the receipt of a valid report from the STU unit. At any time during the existence of a COM FAIL condition, the locomotive engineer may obtain a display of the identification number in the last report that has been received by maintaining the ACK switch in an actuated state. In the event that the major alarm condition is FAULT #, the display of that alarm word cannot be cleared by the locomotive engineer.

Returning now to FIG. 7, the RDU unit is powered either from an auxiliary 12-volt DC voltage source, or from the 72-volt DC voltage source of the locomotive through a converter 260. The power thus supplied is regulated by voltage regulators 262, which provide corresponding outputs 5 V and 12 V. Output 5 V is supplied to the majority of the components of the RDU unit, and output 12 V is supplied to audible beeper 256. Upon application of power to the RDU unit, a voltage monitor 264 receiving output 5 V causes a power-on reset circuit 266 to apply a reset signal to a microcomputer 268, which responsively initializes itself and begins its processing operations. Microcomputer 268 is a single chip microcomputer including a CPU and a data memory and is coupled by a DATA BUS to an address latch 270, a program memory 272, a port 274, a port 276, the display module 258, a dual frequency synthesizer 278, an auxiliary data memory 280, and a demodulator 282. Address latch 270 is coupled by an ADDRESS BUS to program memory 272, display module 258, dual frequency synthesizer 278, and auxiliary data memory 280. A crystal 284 provides a stable frequency reference for the timing operations of microcomputer 268 and for dual frequency synthesizer 278. Dual frequency synthesizer 278 supplies a FREQ. REF. signal to demodulator 282 and a signal to display module 258. The FREQ. REF. signal has a frequency that is an integral multiple of both FSK frequencies, and the signal supplied to display module 258 has a frequency that establishes the "flashing" display of the alert or alarm words thereby, as selected by microcomputer 268. Demodulator 282 supplies an INTERRUPT signal to microcomputer 268, as described hereinafter. Microcomputer 268 also receives a signal from the ACK switch, and provides an output signal to audible beeper 256. Port 274 and a portion of port 276 couple switches 252 to the DATA BUS and thus to microcomputer 268, and another portion of port 276 couples jumper 254 (establishing psi or kpa display) to the DATA BUS and thus to microcomputer 268. Auxiliary data memory 280 is provided because the data memory within microcomputer 268 does not have sufficient storage capability to accommodate all stored data. Not illustrated in FIG. 6 are the various read, write and control signals required to coordinate the transfer of addresses and data on the ADDRESS BUS and the DATA BUS.

Figure 8A:
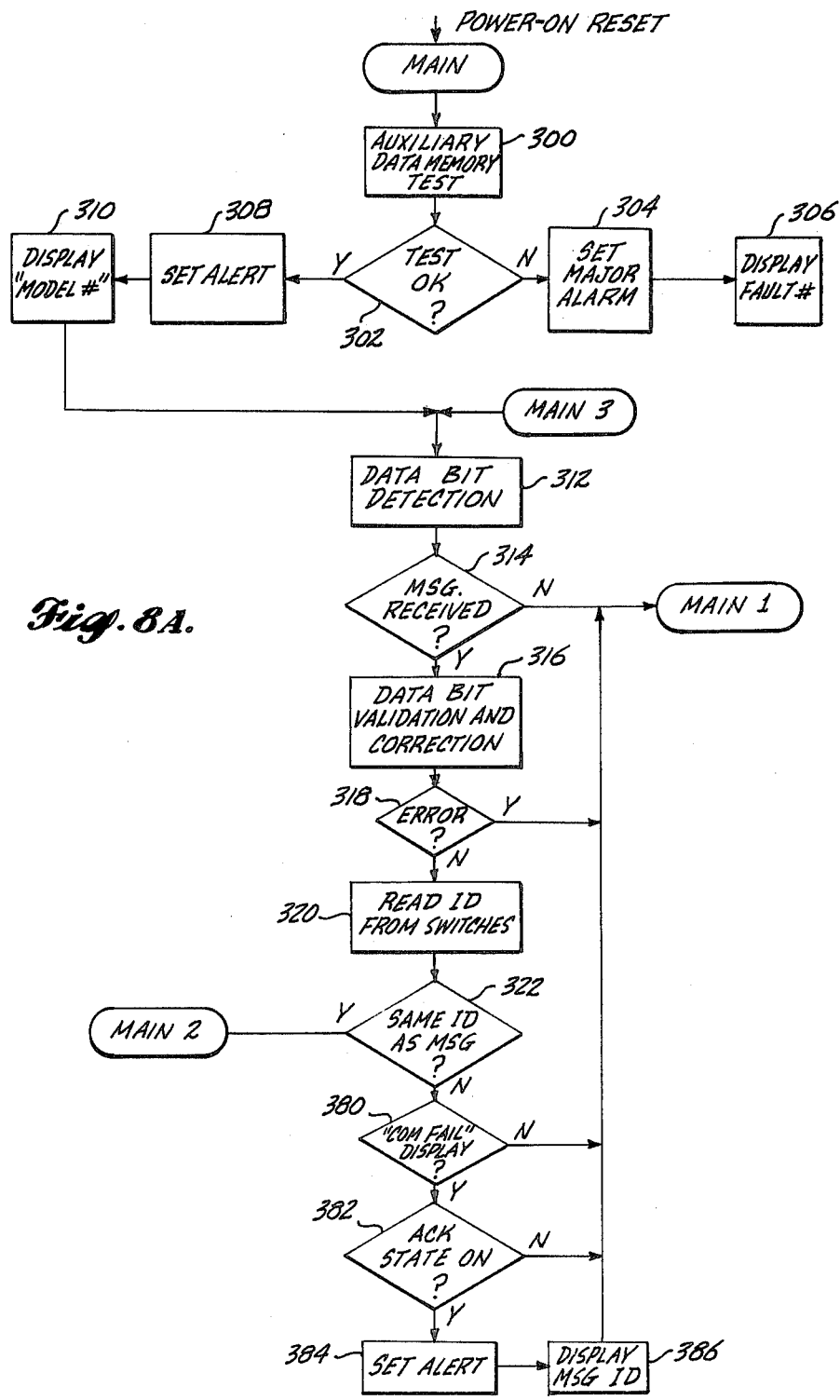

Referring additionally now to FIGS. 8A–8B, illustrating the set of program instructions contained within program memory 272, the operation of the RDU unit will be described. Upon application of power, the reset signal from circuit 266 causes microcomputer 268 to enter a MAIN routine in which a test is first conducted, in step 300, of auxiliary data memory 280. In step 302, microcomputer 268 determines if auxiliary data memory 280 has passed this test. If the determination in step 302 is negative, microcomputer 268 proceeds in step 304 to set a major alarm condition and then proceeds in step 306 to display, via display 258A, a fault number corresponding to the type of fault found in the test in step 300. The major alarm condition results in a series of audible tones being provided by audible beeper 256 and the fault number to be flashed by display 258A at a 2 Hz rate for five seconds, whereafter the fault number is continuously displayed. This major alarm condition can be reset only upon removal and reapplication of power to the RDU unit. If the determination in step 302 is affirmative, microcomputer 268 proceeds in step 308 to set an alert condition and then proceeds in step 310 to display the model number of the RDU unit via display 258A. This alert condition results in a single audible tone being produced by audible beeper 256 and the model number being displayed by display 258A for a period of two seconds, whereafter display 258B is blank.

Microcomputer 268 then proceeds, in step 312, to await the receipt of data from radio receiver 250. Upon the receipt of any report from an STU unit, the corresponding FSK frequencies are demodulated by demodulator 282 and converted into a corresponding bit string. Upon receipt of each bit, a pulse is provided in the INTERRUPT signal to microcomputer 268 to alert microcomputer 268 to the receipt of a data bit. The received bits are transferred in parallel bytes to microcomputer 268 via the DATA BUS. As previously described, each message in the report includes a bit synchronization pattern and a frame synchronization pattern. These patterns are used by microcomputer 268 to synchronize the reading and error checking of the bits within the subsequent data block of the message. During step 312, microcomputer 268 accomplishes a portion of this data transfer. In step 314, microcomputer 268 determines if a complete message has been received. If the determination in step 314 is negative, microcomputer 268 proceeds to a MAIN 1 branch and eventually returns to step 312 through MAIN 3. This process of passing through MAIN 1 and returning through MAIN 3 continues until a complete message has been received and the determination in step 314 is affirmative. Thereafter, microcomputer 268 proceeds in step 316 to validate and correct wherever possible the bits of the received message. In step 318, microcomputer 268 determines if there yet remains an error in the bits of the received message. If the determination in step 318 is affirmative, microcomputer 268 proceeds to the MAIN 1 branch and eventually returns to MAIN 3. Assuming that a valid message has been received, the determination in step 318 is negative, whereupon microcomputer 268 in step 320 reads and stores the identification number from switches 252. In step 322, microcomputer 268 determines if the identification number thus obtained corresponds to that in the message that has been received. If the determination in step 322 is affirmative, microcomputer 268 proceeds to a MAIN 2 branch.

When proceeding through MAIN 2, microcomputer 268 first determines in step 324 if the message that has just been received is the same as the last message received. It will be remembered that each report contains multiple identical and successive messages. If the determination in step 324 is affirmative, the message can be discarded, whereupon microcomputer 268 returns to step 312 through MAIN 3. If the determination in step 324 is negative, microcomputer 268 proceeds, in successive steps 326, 328, 330, 332, and 334, to determine if the STU status in the message is OFF, if either brake pipe pressure in the message is below the low threshold (e.g., 45 psi), if the message contains an "about to fail" battery status indication, if the message contains a "weak" battery status indication, or if the message contains a change in any of the external status inputs. Assuming, for purposes of the present discussion, that each of the determinations in steps 324–334 is negative, microcomputer 268 proceeds, in step 336, to determine whether either of the brake pipe air pressures has changed from that presently displayed. If this determination is affirmative, microcomputer 268 proceeds, in step 338, to display the brake pipe air pressures in the message and then returns to MAIN 3. Assuming that a subsequent message has not been received, the determination in step 314 is negative, whereupon microcomputer 268 proceeds to MAIN 1 and eventually returns to MAIN 3. Assuming that a subsequent valid message has been received and further assuming that there has been no change in either brake pipe air pressure, the determination in step 314 is affirmative and microcomputer 268 proceeds to and through MAIN 2. In this event, the determination in step 336 is negative, whereupon microcomputer 268 proceeds to MAIN 1 and eventually returns to MAIN 3. As a result, the brake pipe air pressures in any message will be continuously displayed until the receipt of a subsequent message indicating a different brake pipe air pressure.

Let it be assumed that detection of one of the conditions represented by steps 326–334 in the message has occurred and that the determination in one of those steps is accordingly affirmative. If the message indicates that the STU status is OFF, microcomputer 268 proceeds in step 338 to set a minor alarm condition and then proceeds in step 340 to display the NO AIR alarm word. If the message indicates that either brake pipe air pressure is below the low threshold, microcomputer 268 proceeds in step 342 to set a minor alarm condition and then proceeds in step 344 to display the LO PRESS alarm word. If the message contains an "about to fail" battery status indication, microcomputer 268 proceeds in step 346 to set a major alarm condition and then proceeds in step 348 to display the BAT FAIL alarm word. If the message contains a "weak" battery status indication, microcomputer 268 proceeds in step 350 to set a minor alarm condition and then proceeds in step 352 to display the BAT WEAK alarm word. If any of the external status inputs has changed, microcomputer 268 proceeds in step 354 to set an alert condition and then proceeds in step 356 to display the STATUS alert word. It should be noted that microcomputer 268 will proceed to the succeeding steps in steps 326–334 only if the determinations in the preceding steps are each negative, thereby affording a priority to the alarm and alert conditions. In the event that any given message contains data that would result in more than one alarm or alert condition, only the highest-priority alarm or alert condition will be acted upon. However, all of the data in the message remains stored in microcomputer 268 for subsequent processing. From each of steps 340–356, microcomputer 268 returns to MAIN 3.

As previously described, microcomputer 268 will proceed to MAIN 1 upon the occurrence of certain events. In step 360, microcomputer 268 determines if the time has expired for any alarm or alert condition. As previously described, the alert condition normally persists for two seconds, and both the alarm conditions normally persist for five seconds. If the determination in step 360 is affirmative, microcomputer 268 proceeds, in step 362, to terminate any audible tones that are being provided and to revert the display. As previously described, display 258A is always reverted to a display of the brake pipe air pressures except in the case of the NO AIR and COM FAIL alarm conditions. Upon reversion of the display in the case of the BAT FAIL condition, a "F" is displayed in the battery indication digit of display 258A. Upon reversion of the display in the case of the BAT WEAK condition, a "B" is displayed in the battery indication digit of display 258A. Upon reversion of the display in the case of a STATUS condition, a "S" is displayed in the status changed indication digit of display 258A. Thereafter, microcomputer 268 returns to MAIN 3, whereupon the display remains in its reverted mode until receipt of a subsequent, valid report or the existence of a COM FAIL condition, as will be hereinafter described.

If the determination in step 360 is negative, microcomputer 268 next determines, in step 364, if the state of the ACK switch has been changed. As previously discussed, the locomotive engineer may terminate any alarm or alert condition by actuation of the ACK switch. If the determination in step 364 is negative, microcomputer 268 proceeds in step 366 to determine if a COM FAIL condition exists. In doing so, microcomputer 268 determines if a period of three minutes has elapsed from the last valid report from the STU unit whose identification number is set by switches 252. If the determination in step 366 is negative, microcomputer 268 resets any display of the COM FAIL alarm word that may be occurring and then returns to MAIN 3. If the determination in step 366 is affirmative, microcomputer 268 proceeds in step 368 to set a major alarm condition and then proceeds in step 370 to display the COM FAIL alarm word. From step 370, microcomputer 268 returns to MAIN 3.

Let it now be assumed that the locomotive engineer has actuated or deactuated the ACK switch. In this event, the determination in step 364 is affirmative, whereupon microcomputer 268 proceeds in step 372 to determine the state of the ACK switch. If the ACK switch is actuated, microcomputer 268 proceeds in step 374 to terminate any alarm or alert condition then existing and then proceeds in step 376 to provide an appropriate display. In the event that there is no alarm or alert condition or in the event of any alarm or alert condition excepting the COM FAIL condition, the states of the various external status inputs are displayed by display 258A. In the event that the alarm condition is the COM FAIL condition, the STU identification number contained in the most recent message received by the RDU unit is displayed by display 258A. This STU identification number may be either that of the STU unit at the rear of last vehicle 12 or that of another STU unit (e.g., that installed on an adjacent train). When the locomotive engineer deactuates the ACK switch, microcomputer 268 proceeds from step 372 to step 378, wherein the display reverts to its normal mode (as previously described in conjunction with step 362). From either step 376 or step 378, microcomputer 268 returns to MAIN 3.

It should be noted at this point that a COM FAIL condition can occur for two reasons: first, an actual failure in communications, whereupon microcomputer 268 fails to receive any messages from the STU unit at the rear of last vehicle 12; and, second, an improper setting of the identification number in switches 252. In the first case, microcomputer 268 will successively loop through steps 312 and 314, MAIN 1, and MAIN 3. In the second case, the receipt of a valid message from the STU unit at the rear of last vehicle 12 will result in a negative determination in step 322, whereupon microcomputer 268 determines in step 380 if the COM FAIL alarm word is being displayed. Upon the first such message, the determination in step 380 is negative, whereupon microcomputer 268 proceeds to MAIN 1 and then continues to loop through MAIN 1, MAIN 3, and steps 312-322 and 380 as subsequent valid messages from the STU unit are received. After elapse of the three minute period, the determination in step 366 (FIG. 8B) is affirmative and display of the COM FAIL alarm word is made as previously described. During existence of the COM FAIL condition, the STU identification number contained in the last message may be displayed as previously described (reference step 376). Upon reset of the COM FAIL condition, the continued display of the COM FAIL alarm word results in an affirmative determination in step 380, whereupon microcomputer 268 proceeds in step 382 to determine if the ACK switch has been actuated. If the determination in step 382 is negative, microcomputer 268 proceeds to MAIN 1 and thereafter as previously described. If the determination in step 382 is affirmative, microcomputer 268 proceeds in step 384 to set an alert condition and thereafter proceeds in step 386 to display the STU identification number in the last received message. From step 386, microcomputer 268 proceeds to MAIN 1 and thereafter as previously described. Accordingly, once a COM FAIL condition has existed, the locomotive engineer may obtain a display of the STU identification number in any message from the STU unit.

While the invention has been described with reference to a preferred embodiment, it is to be clearly understood by those skilled in the art that the invention is not limited thereto, and that the scope of the invention is to be interpreted only in conjunction with the following claims.

The embodiments of the invention in which an exclusive property privilege is claimed are defined as follows:

1. A railway brake pressure monitor comprising:
   a sensor/transmitter unit constructed so as to be mounted on the last vehicle of a railway train and coupled with the brake pipe of the last vehicle, said sensor/transmitter unit including: means for providing an output signal proportional to the air pressure within the brake pipe; means for repetitively monitoring said output signal to measure the value of said brake pipe air pressure; means for storing said brake pipe air pressure value; means for transmitting a report including said brake pipe air pressure value as currently stored; and, means for enabling the transmission of said report in response to the occurrence of a predetermined event; and,
   a remote display unit constructed so as to be mounted in the locomotive of the railway train, said remote display unit including: means for receiving each said report from said sensor/transmitter unit; means for extracting said brake pipe air pressure value from each said report; and, means for displaying said brake pipe air pressure value.

2. The monitor of claim 1, wherein said remote display unit further includes: means for detecting whenever said brake pipe air pressure value in any said report is less than a predetermined value; and, means responsive to said detection for providing a corresponding alarm.

3. The monitor of claim 2, wherein said predetermined value is substantially 45 psi.

4. The monitor of claim 1, wherein said means for enabling the transmission of a report is responsive to the occurrence of the event that said brake pipe air pressure value has been less than a predetermined amount for a predetermined interval since the last report by said sensor/transmitter unit.

5. The monitor of claim 4, wherein said predetermined amount is substantially 5 psi.

6. The monitor of claim 4, wherein said predetermined interval is substantially five minutes.

7. The monitor of claim 4, wherein said remote display unit further includes means responsive to the transmission of said report in said event for providing a corresponding alarm.

8. The monitor of claim 1, wherein said means for enabling the transmission of a report is responsive to the occurrence of the event that said brake pipe air pressure value that is currently stored has changed by more than a predetermined amount from that value thereof stored at the time of the last report by said sensor/transmitter unit.

9. The monitor of claim 8, wherein said predetermined amount is substantially 5 psi.

10. The monitor of claim 1, wherein said means for enabling the transmission of a report is responsive to the occurrence of the event that said brake pipe air pressure value as currently stored has changed by more than a predetermined amount from that value thereof stored at the time of the last report by said sensor/transmitter unit and a predetermined interval has elapsed since that last report.

11. The monitor of claim 10, wherein said predetermined amount is substantially 2 psi.

12. The monitor of claim 10, wherein said predetermined interval is substantially 5 seconds.

13. The monitor of claim 1, wherein said means for enabling the transmission of a report is responsive to the occurrence of the event that a random interval has elapsed since the last report by said sensor/transmitter unit.

14. The monitor of claim 13, wherein said random interval is in the range of substantially 55 to substantially 65 seconds.

15. The monitor of claim 1, wherein said sensor/transmitter unit further includes: means for receiving a plurality of external status input signals, each representing the state of a corresponding external device; means for repetitively monitoring said plurality of external status input signals to obtain the states thereof; means for storing said external status input signal states;
wherein said means for transmitting is operative to include, in said report, said external status input signal states as currently stored;
wherein said means for extracting in said remote display unit is further operative to extract said external status input signal states; and,
wherein said remote display unit further includes means for selectively displaying said external status input signal states.

16. The monitor of claim 15, wherein said means for enabling the transmission of a report is responsive to the occurrence of the event that any of said external status input states have changed since the last report by said sensor/transmitter unit.

17. The monitor of claim 15, wherein said remote display unit further includes: means for detecting whether any of said external status input signal states in any said report have changed since the last report by said sensor/transmitter unit; and, means responsive to said detection for providing a corresponding alarm.

18. The monitor of claim 1, wherein said sensor transmitter unit further includes: a battery for supplying a battery voltage to said sensor/transmitter unit; means for repetitively monitoring said battery voltage to measure the value thereof; means for determining and storing a battery status indication from said battery voltage value, said battery status indication representing either an acceptable battery status, a weak battery status, or an about to fail battery status;
wherein said means for transmitting is operative to include, in said report, said battery status indication as currently stored;
wherein said means for extracting in said remote display unit is further operative to extract said battery status indication; and,
wherein said remote display unit further includes means for selectively displaying said battery status indication.

19. The monitor of claim 18, wherein said remote display unit further includes: means for detecting whether said battery status indication in any said report represents a weak battery status; and, means responsive to said detection for providing a corresponding alarm.

20. The monitor of claim 18, wherein said remote display further includes: means for detecting whether said battery status indication in any said report represents an about to fail battery status; and, means responsive to said detection for providing a corresponding alarm.

21. The monitor of claim 1, wherein said remote display unit further includes: means for detecting the absence of reports from said sensor/transmitter unit for a predetermined interval; and, means responsive to said detection for providing a corresponding alarm.

22. The monitor of claim 21, wherein said predetermined interval is substantially three minutes.

23. The monitor of claim 1, wherein said sensor/transmitter unit further includes means for storing a sensor/transmitter unit identification number;
wherein said means for transmitting is operative to include, in said report, said sensor/transmitter unit identification number that is stored;
wherein said means for extracting in said remote display unit is further operative to extract said sensor/transmitter unit identification number in said report; and,
wherein said remote display unit further includes: means for storing a sensor/transmitter unit identification number; and, means for recognizing a report as valid only in the event that said sensor/transmitter unit identification number in any said report is the same as said sensor/transmitter unit identification number stored in said remote display unit.

24. The monitor of claim 23, wherein said remote display unit further includes means for selectively displaying said sensor/transmitter unit identification number in any said report.

25. The monitor of claim 1, wherein said remote display unit further includes: means for detecting the absence of valid reports of said sensor/transmitter unit for a predetermined interval; and, means responsive to said detection for providing a corresponding alarm.

26. The monitor of claim 25, wherein said predetermined interval is substantially three minutes.

27. The monitor of claims 2, 7, 17, 19, 20, 21 or 25, wherein said remote display unit includes manually-actuable means for resetting said corresponding alarm.

28. The monitor of claim 1, wherein said means for transmitting in said sensor/transmitter unit includes means for providing a modulated RF carrier signal; and, wherein said means for extracting in said remote display unit includes means for demodulating said modulated RF carrier signal.

29. The monitor of claim 28, wherein said RF carrier signal is modulated by frequency shift keying.

* * * * *

UNITED STATES PATENT AND TRADEMARK OFFICE
CERTIFICATE OF CORRECTION

PATENT NO. : 4,487,060
DATED : December 11, 1984
INVENTOR(S) : Richard J. Pomeroy It is certified that error appears in the above-identified patent and that said Letters Patent is hereby corrected as shown below:

Title Page [73] Assignee: "Glenayre Electronis, Ltd." Vancouver," should read -- DSL Dynamic Sciences Limited, Quebec, --.

Column 5, line 37, "50" should be --58--

Column 6, line 11, "rechargable" should be --rechargeable--

Column 12, line 36, "258B" should be --258A--

Column 15, line 13, "258B" should be --258A--

Column 18, line 37, insert "or" after "property"

Signed and Sealed this

Seventh Day of January 1986

[SEAL]

Attest:

DONALD J. QUIGG

Attesting Officer

Commissioner of Patents and Trademarks